(12) United States Patent
Whaley

(10) Patent No.: US 6,359,072 B1
(45) Date of Patent: Mar. 19, 2002

(54) POLYETHYLENE FILMS HAVING IMPROVED OPTICAL PROPERTIES

(75) Inventor: Paul D. Whaley, Belle Mead, NJ (US)

(73) Assignee: Univation Technologies, LLC, Houston, TX (US)

(*) Notice: Subject to any disclaimer, the term of this patent is extended or adjusted under 35 U.S.C. 154(b) by 0 days.

(21) Appl. No.: 09/505,648

(22) Filed: Feb. 16, 2000

(51) Int. Cl.⁷ .................. C08F 8/00; C08L 23/00; C08L 23/04
(52) U.S. Cl. .................. 525/191; 525/240
(58) Field of Search .................. 525/191, 240

(56) References Cited

U.S. PATENT DOCUMENTS

| | | | |
|---|---|---|---|
| 3,183,283 A | * | 5/1965 | Reding |
| 4,367,256 A | * | 1/1983 | Biel |
| 4,598,128 A | * | 7/1986 | Randall et al. |
| 5,066,725 A | * | 11/1991 | Haselier |
| 5,091,228 A | * | 2/1992 | Fujii et al. |
| 5,320,887 A | * | 6/1994 | Moss et al. |
| 5,376,439 A | * | 12/1994 | Hodgson et al. |
| 5,378,764 A | * | 1/1995 | Benham et al. |
| 5,382,631 A | * | 1/1995 | Stehling et al. |
| 5,530,065 A | | 6/1996 | Farley et al. |
| 5,536,796 A | | 7/1996 | Jejelowo et al. |
| 5,548,014 A | | 8/1996 | Tse et al. |
| 5,707,751 A | | 1/1998 | Garza et al. |
| 5,714,547 A | | 2/1998 | Li et al. |
| 5,747,594 A | * | 5/1998 | deGroot et al. |
| 5,773,106 A | | 6/1998 | deGroot et al. |
| 5,792,534 A | | 8/1998 | deGroot et al. |
| 5,874,139 A | * | 2/1999 | Bosiers et al. ............. 428/35.2 |
| 6,187,424 B1 | * | 2/2001 | Kjellqvist et al. .......... 428/220 |

FOREIGN PATENT DOCUMENTS

| | | | |
|---|---|---|---|
| CA | 641369 | * | 5/1962 |
| WO | WO 90/03414 | * | 4/1990 |

* cited by examiner

Primary Examiner—Nathan M. Nutter
(74) Attorney, Agent, or Firm—Lisa Kimes Jones

(57) ABSTRACT

Unique blends of metallocene catalyzed polymers are disclosed. The blends of the invention include a first polyethylene having a narrow molecular weight distribution and a narrow composition distribution breadth index (CDBI), and a second polyethylene having a relatively broad molecular weight distribution and a very narrow CDBI. The blend is advantageously used when it includes 50 percent or greater of the first polyethylene and 50 percent or less of the second polyethylene. Blown film made from the blend will have an unexpectedly good set of optical properties.

16 Claims, 1 Drawing Sheet

POLYETHYLENE FILMS HAVING IMPROVED OPTICAL PROPERTIES

FIELD OF THE INVENTION

The present invention relates to high clarity films and articles made from such films. In particular, the invention relates to a blend of metallocene produced polyethylenes (mPE), one of which has a narrow molecular weight distribution and narrow composition distribution, the other has a broader molecular weight distribution and a more narrow composition distribution.

BACKGROUND OF THE INVENTION

Various types of polymers are used to form films; such films may then be used to form packages or bags. Polymers or blends of polymers used to make films are selected for use because they provide good physical properties, good processability, good clarity or a combination of these attributes.

Since the advent of metallocene catalyzed polyolefins, most especially metallocene catalyzed polyethylenes (mPEs), fabricators of films made from such polyethylenes have sought to find a balance of good physical properties and good optics, along with good processability. Heretofore the physical properties of such polyethylenes have been generally superior to the Zeigler-Natta catalyzed polyethylenes which preceded them. However, melt processing, specifically extruding, has proven more difficult for these later generation polyethylenes (mPEs) versus the earlier Zeigler-Natta catalyzed polyethylenes (Z-N PEs). Further, in both Z-N PEs and mPEs the relative poor clarity of films produced from these polyethylenes has prevented the use of these films in traditional high clarity applications. Such high clarity applications include apparel bags and/or coverings, bread bags, produce bags and the like.

Many plastic materials are known to possess good physical and mechanical properties but often do not also possess good optical properties, specifically of note are the mPEs discussed above. Conversely, some polymers with good clarity do not have adequate strength. Many metallocene catalyzed polyethylenes have excellent physical properties such as dart drop impact and good Elmendorf tear, but have relatively poor clarity and haze.

Blends of high pressure process produced polyethylenes (HP-LDPE) with either mPE and Z-N PE can generally improve the optics of the resulting film over that of either mPE or Z-N PE by themselves. This optics improvement however generally results in a reduction in other physical properties; most notably Elmendorf Tear (generally in the machine direction (MD)) and dart drop impact resistance. Such blends also improve the processing compared to Z-N PE or mPE by themselves.

Previously known blends or coextruded polyethylenes, designed to improve one or more of the properties of a resulting film relative to its components or relative to unblended polyethylene, in the past have also suffered from the drawbacks mentioned above in that improving one property generally leads to diminishing one or more of the other properties. For example, incorporating a blend component with a high average comonomer content to reduce crystallinity and improve heat sealability generally results in an increase of extractables and adversely affects other properties so that the full advantage of the blend is not realized.

U.S. Pat. No. 5,530,065 suggests a blend of a metallocene catalyzed polymer, Component A and a conventional Ziegler-Natta catalyzed polymer, Component B. Component A is said to have a narrow molecular weight distribution and narrow composition distribution, while Component B is said to have a broad molecular weight distribution and a broad composition distribution Therefore, there is a commercial need for a polyethylene or polyethylene blend that has both good physical properties and excellent clarity and haze.

SUMMARY OF THE INVENTION

The blend of polymers of embodiments of this invention generally include at least a first polymer, Component A, which has a narrow molecular weight distribution and a narrow composition distribution and at least a second polymer, Component B, which has a broader molecular weight distribution than Component A and an extremely narrow composition distribution.

In one preferred embodiment of the invention, Component A and Component B is produced by a metallocene catalyst.

In another embodiment of the invention, Component A comprises between 10 to 90 weight percent of the total weight percent polymer blend and Component B comprises between 90 to 10 weight percent of the total weight percent polymer blend of the invention.

The molecular weight distribution or MWD (also Mw/Mn) of Component A is in the range of from 1.5 to 3.0 and the composition distribution breadth index (CDBI) in the range of from 50 to 70%. The relaxation spectrum index (RSI), normalized for melt index of Component A of the blend, will be in the range of from 1.8 to 2.5. The branching factor will be in the range of from 0.95 to 1.0.

The MWD of Component B will be in the range of from 3.5 to 15, and the CDBI in the range of from 75 to 90%. The relaxation spectrum index (RSI), normalized for melt index of Component B of the blend, will be in the range of from 8 to 11. The branching factor will be in the range of from 0.7 to 0.8.

The haze of the blend will be in the range of from 3 to 10%, preferably 4 to 9%, more preferably 5 to 9%, most preferably 5 to 8%, while the gloss (45 degree) will be in the range of from 50 to 80, preferably 55 to 75, more preferably 60 to 75.

In yet another embodiment, the polymer blend of the invention is useful in or as a film or part of a multilayer film in an article of manufacture.

BRIEF DESCRIPTION OF THE DRAWINGS

The foregoing aspects, features, and advantages of the invention will become clearer and more fully understood when the following detailed description is read in conjunction with the accompanying drawings, in which.

DETAILED DESCRIPTION OF THE INVENTION

Introduction

Figure 1:
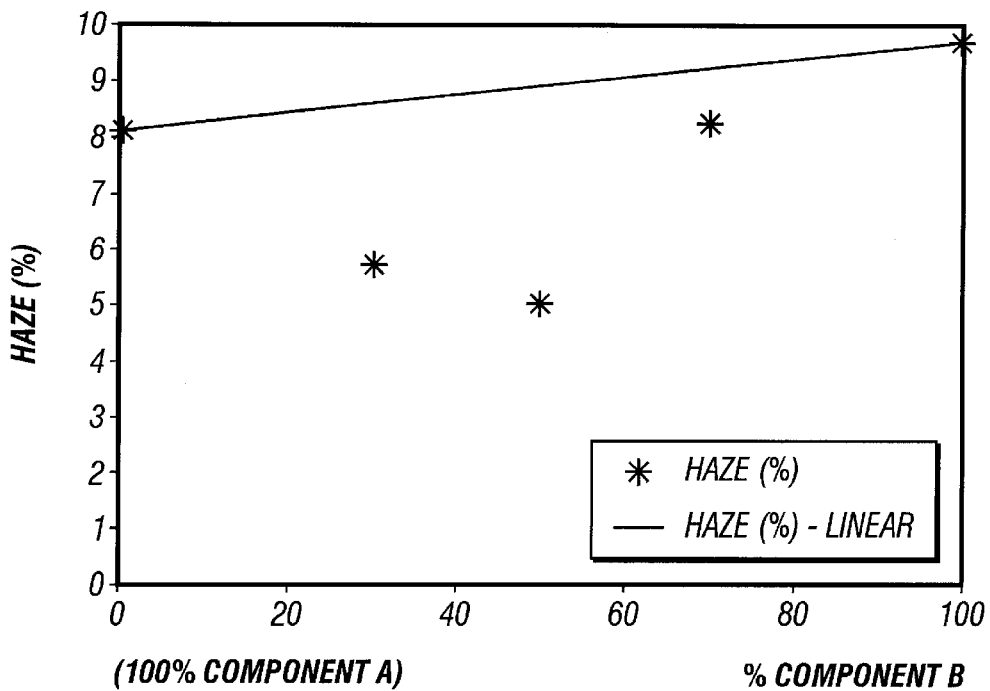
FIG. 1 illustrates the haze of both 100% Component A and 100% Component B and several blends of the two. The line drawn from the haze of 100% Component A to the haze of 100% of Component B represents the linear, expected haze of the blend spectrum.
Figure 2:
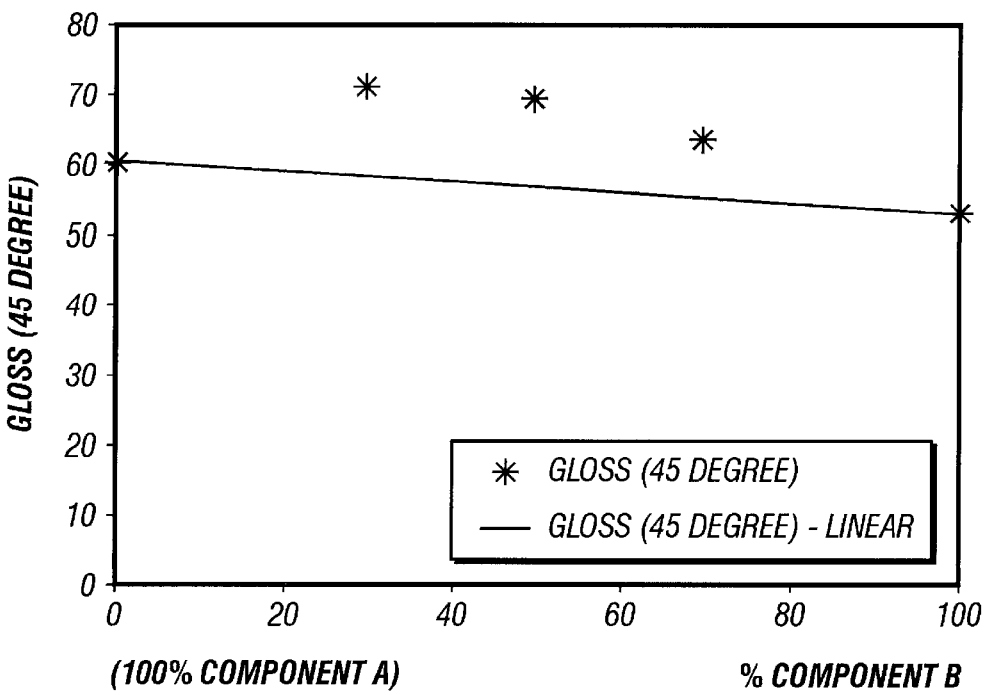
FIG. 2 illustrates the gloss (45 degree) of both 100% Component A and 100% Component B and several blends of the two. The line drawn from the gloss of 100% Component A to the gloss of 100% of Component B represents the linear, expected gloss of the blend spectrum.

Surprisingly and unexpectedly a new polymer blend has been discovered that retains good physical properties and processability while greatly improving optical properties as determined by haze and gloss.

Embodiments of this invention concern a blend of preferably at least two metallocene catalyzed polymers, Component A and a Component B, their production and applications for their use. The polymer blends of embodiments of this invention have unique properties which make the blend particularly well suited for use in polymeric films. These films are very useful in applications requiring good physical properties combined with excellent clarity.

Terms and Definitions

Physical and optical property testing of films were done in accordance with ASTM standards. Tensile properties and secant modules were obtained by testing according to ASTM D-882. Elmendorf tear values were obtained by testing according to ASTM D-1922 while dart impact values were obtained by testing according to ASTM D-1709. Optical properties of the film, such as haze, were measured using ASTM D-1003 and gloss was measured using ASTM 2457.

Characteristics of Polymer Components of the Invention

A characteristic of the polymers of Component A and Component B of the present invention is their composition distribution (CD). As is well known to those skilled in the art, the composition distribution of a copolymer relates to the uniformity of distribution of comonomer among the molecules of the copolymer. Metallocene catalysts are known to incorporate comonomer very evenly among the polymer molecules they produce. Thus, copolymers produced from a catalyst system having a single metallocene component have a narrow composition distribution, most of the polymer molecules will have roughly the same comonomer content, and within each molecule the comonomer will be randomly distributed. Ziegler-Natta catalysts, on the other hand generally yield copolymers having a considerably broader composition distribution. Comonomer inclusion will vary widely among the polymer molecules.

Composition Distribution Breadth Index

A measure of composition distribution is the "Composition Distribution Breadth Index" ("CDBI"). CDBI is defined as the weight percent of the copolymer molecules having a comonomer content within 50% (that is, 25% on each side) of the median total molar comonomer content. The CDBI of a copolymer is readily determined utilizing well known techniques for isolating individual fractions of a sample of the copolymer. One such technique is Temperature Rising Elution Fraction (TREF), as described in Wild, et al., *J. Poly. Sci., Poly. Phys. Ed.,* vol. 20, p. 441 (1982) and U.S. Pat. No. 5,008,204, which are incorporated herein by reference for purposes of U.S. patent practice.

To determine CDBI, a solubility distribution curve is first generated for the copolymer. This may be accomplished using data acquired from the TREF technique described above. This solubility distribution curve is a plot of the weight fraction of the copolymer that is solubilized as a function of temperature. This is converted to a weight fraction versus composition distribution curve. For the purpose of simplifying the correlation of composition with elution temperature the weight fractions less than 15,000 are ignored. These low weight fractions generally represent a trivial portion of the resin of the present invention. The remainder, of this description and the appended claims, maintains this convention of ignoring weight fractions below 15,000 in the CDBI measurement.

From the weight fraction versus composition distribution curve the CDBI is determined by establishing what weight percent of the sample has a comonomer content within 25% each side of the median comonomer content. Further details of determining the CDBI of a copolymer are known to those skilled in the art. See, for example, PCT Patent Application WO 93/03093, published Feb. 18, 1993. The polymer blend components of the present invention have CDBI's generally in the range of 50 to 98%, usually in the range of 60 to 98% and most typically in the range of 65 to 95%. Higher or lower CDBI's may be obtained using other catalyst systems with changes in the operating conditions of the process employed.

The CDBI of Component A of the present invention is in the range of from 50 to 80%, preferably in the range of from 55 to 75%, more preferably in the range of from 50 to 70%.

The CDBI of Component B of the present invention is in the range of from 75 to 95%, preferably in the range of from 75 to 90%, more preferably in the range of from 80 to 90%.

Polydispersity

MWD, or polydispersity, is a well known characteristic of polymers. MWD is generally described as the ratio of the weight average molecular weight (Mw) to the number average molecular weight (Mn). The ratio Mw/Mn can be measured directly by gel permeation chromatography techniques as are well known in the art.

Those skilled in the art will appreciate that there are several methods for determining MWD of a polymer sample. For the purposes of this patent specification the molecular weight distribution of a polymer can be determined with a Waters Gel Permeation Chromatograph equipped with Ultrastyrogel columns and a refractive index detector. In this development, the operating temperature of the instrument was set at 145° C., the eluting solvent was trichlorobenzene, and the calibration standards included sixteen polystyrenes of precisely known molecular weight, ranging from a molecular weight of 500 to a molecular weight of 5.2 million, and a polyethylene standard, NBS 1475.

The MWD of the polymer Component A of this invention are termed "narrow". For the purposes of this patent specification "narrow" MWD means a Mw/Mn less than 3, preferably in the range of from 1.5 to 3.0, more preferably in the range of 2.5 to 3.0.

The MWD of the polymer Component B of this invention are termed "relatively broad" relative that is to the above, Component A MWD. The MWD of the B Component is in the range of from 3.5 to 15, preferably in the range of from 3.5 to 10, preferably in the range of 3.5 to 7.5, more preferably in the range of from 3.5 to 5.0.

Relaxation Spectrum Index

Determination of the relaxation spectrum index (RSI) of polymers, is described in U.S. Pat No. 5,798,427 incorporated herein by reference for purposes of U.S. patent practice.

The RSI (normalized for melt index) of the polymer Component A of embodiments of my invention will be in the range of from 1.0 to 4.0, preferably 1.5 to 3.0, more preferably in the range of from 2.0 to 3.0, most preferably in the range of from 2.5 to 3.0.

The RSI (normalized for melt index) of the polymer Component B of embodiments of my invention will be in the range of from 6.0 to 14.0, preferably 7.0 to 12.0, more preferably in the range of from 8.0 to 11.0.

Intrinsic Viscosity vs $\log_{10} I_2$

Another methodology to characterize polymers with rheologically active long chain branching (LCB) is to make use of the polymer-type discrimination capabilities seen in plots of intrinsic viscosity [η] versus log melt index (MI). This empirical characterization technique was published in an article in The Journal of Applied Polymer Science, Vol. 13, pp 341–351 (1969).

The [η] vs. log MI plots have been shown to group linear polymers and those having LCB content such as HP-LDPE into separated lines. These effects can be normalized with respect to melt index to provide a characterization index which discriminates polymer types based on levels of rheologically-active LCB.

The G-Factor ($G_v$)

A plot of log melt index (MI), ASTM D-1238 measured at 190° C. vs. intrinsic viscosity, [η], measured in Decalin at 135° C. for a wide range of linear polyethylenes versus that representing a series of HP-LDPE having substantial LCB content provides a further manner of looking at branching. An index, $G_v$(G-factor) is derived from the log MI vs [η] plot as:

$$G_v = [\eta]_{BR,MI}/[\eta]_{LN,MI} \quad (I)$$

where $[\eta]_{BR,MI}$ is the experimentally measured intrinsic viscosity of a sample of melt index MI. $[\eta]_{LN,MI}$ is the calculated intrinsic viscosity as defined from the relationship of [η] vs. Log MI for linear PE—i.e. $[\eta]_{LN,MI} = -0.699 \ast \log MI + 1.851$. To calculate $G_v$, we measure the intrinsic viscosity and melt index for a sample, then compute, for the measured MI, what the linear [η] would be. We then normalize the measured $[\eta]_{BR,MI}$ by dividing using the linear $[\eta]_{LN,MI}$ value to give $G_v$, analogous to the calculation of G' from intrinsic viscosity and molecular weight (viscosity average) parameters.

This G-factor parameter, $G_v$, is sensitive to the presence of rheologically-active LCB. As such, the G-factor reflects LCBs (that matter to resin processability and is relatively insensitive to molecular weight distribution, as reflected by Mw/Mn).

The branching factor for Component A is in the range of from 0.95 to 1.0. The branching factor for Component B is in the range of from 0.7 to 0.8, and preferably in the range from 0.72 to 0.78.

Melt Index

The Melt Index (MI) of the polymers of the invention (both Component A and Component B) are generally in the range of from 0.1 dg/min to 1000 dg/min, preferably 0.2 dg/min to 300 dg/min, more preferably 0.3 to 200 dg/min and most preferably 0.5 dg/min to 100 dg/min. MI ($I_2$) is measured according to ASTM D-1238, Condition E, at 190° C., $I_{21}$ is measured according to ASTM D-1238, Condition F, at 190° C.) and the melt flow ratio (MFR) is $I_{21}/I_2$.

Density

Contemplated densities of Component A and/or Component B of the invention are in the range of from 0.86 to 0.97 g/cm$^3$, preferably from 0.88 to 0.96 g/cm$^3$, more preferably from 0.90 to 0.95 g/cm$^3$, more preferably from 0.90 to 0.93 g/cm$^3$, and most preferably from 0.910 to 0.925 g/cm$^3$.

In another embodiment, Component A may consist of a blend of Component A polymers, which can be prepared by blending the desired components in the desired proportion using conventional blending techniques and apparatus, such as, for example, screw-type extruders, Banbury mixers, and the like. Alternatively, the blends may be made by direct polymerization, without isolation of the blend components, using, for example, two or more catalysts in one reactor, or by using a single catalyst and two or more reactors in series or parallel.

The B Component of the polymer blend of the invention may consist of a blend of different polymers, each differing in one or more of: molecular weight, MWD, comonomer type and content, density, MI and CD as long as the overall blend making up the B Component has the MWD and CD as discussed above.

BLENDS, FILMS AND ARTICLES OF THE INVENTION

The polymer blend of embodiments of the invention, herein referred to as, the "A-B blend", may be used to form articles with particularly desirable optical properties.

For example, in one embodiment, the A-B blend may be used to form films which are in turn formed into bags or pouches by heat sealing techniques known in the art. The articles described herein are formed from the A-B blend of the invention. The A-B blend of polymers may be formed into films by methods well known in the art. For example, the polymers may be extruded in a molten state through a flat die and then cooled. Alternatively, the polymers may be extruded in a molten state through an annular die and then blown and cooled to form a tubular film. The tubular film may be axially slit and unfolded to form a flat film. The films of the invention may be unoriented, uniaxially oriented or biaxially oriented. The optical properties referred to in the present description are those of blown films.

In another embodiment, the films of the invention may be single layer or multiple layer films. The multiple layer films may comprise one or more layers formed from the A-B polymer blend. The films may also have one or more additional layers formed from other materials such as other polymers, polypropylene, polyester, low density polyethylene, high density polyethylene, ethylene vinyl acetate, ethylene vinyl alcohol and the like.

Multiple layer films may be formed by methods well known in the art. If all layers are polymers, the polymers may be coextruded through a coextrusion feedblock and die assembly to yield a film with two or more layers adhered together but differing in composition. Multiple layer films may also be formed by extrusion coating whereby a substrate material is contacted with the hot molten polymer as the polymer exits the die.

Blend Proportions

In one embodiment, the polymer blend of the invention contains 10 to 90 weight percent of polymer Component A, preferably 40 to 85 percent, more preferably 50 to 80 weight percent, even more preferably 50 to 75 weight percent.

In one embodiment of the invention the polymer blend contains 90 to 10 weight percent of polymer Component B, preferably 15 to 60 weight percent, more preferably 50 to 20 weight percent, even more preferably 50 to 25 weight percent. All weight percentages of the A-B blends refer to a total of 100 percent of the total polyethylene content.

In another embodiment, the blend may also be compounded with various conventional additives known in the art such as, for example, antioxidants, UV stabilizers, pigments, fillers, slip additives, block additives, and the like.

EXAMPLES

In order to provide a better understanding of the present invention including representative advantages thereof, the following examples are offered.

Component A is an mPE produced in a gas phase polymerization reaction utilizing the metallocene catalyst bis(1, 3-methyl-n-butyl cyclopentadienyl) zirconium dichloride, and Component B is an mPE produced in a gas phase polymerization reaction utilizing the metallocene catalyst dimethylsilyl-bis(tetrahydroindenyl)zirconium dichloride.

Typical gas phase polymerization processes and the preparation of both bis(1,3-methyl-n-butyl cyclopentadienyl) zirconium dichloride and dimethylsilyl-bis(tetrahydroindenyl) zirconium dichloride are as described in PCT Publication No. WO 00/02930, published Jan. 20, 2000, herein incorporated by reference.

Example I

Blends of granular Component B, a nominal 1.0 melt index (MI), 0.920 g/cm$^3$ density polyethylene (mPE) and Component A, a nominal 1.0 MI, 0.917 g/cm$^3$ density polyethylene are used in this example. Blends are made at 30/70, 50/50 and 70/30, weight percent Component B/Component, respectively, where the weight percent of each component is based upon total weight polyethylene content. Each of the blends and the unblended Component A and Component B are formulated with 1500 ppm each of Irganox ®1076 and Irgafos ®168, both from Ciba-Geigy, Tarrytown, N.Y., and 1000 ppm of Dynamar® FX-9613, a product of Dyneon Corp, Oakdale, Minn. The films were made on a 3.5 inch (8.89 cm) Gloucester blown film line with a 6 inch die with a 90 mil die gap and a Polycool® air ring. Processing conditions and film properties are shown on table 1. RSI Component A, 2.2, branching factor 0.95, RSI Component B 11.5, branching factor 0.75.

Processability, as measured by motor load (amps) and head pressure gets progressively more difficult (higher) as the percentage of Component A increases.

Film physical properties for the blends, specifically tensile strengths, modulus and dart impact follow a predicted linear trend with composition. Non-linear, therefore surprising and unexpected properties, are tear, haze and gloss.

As can be seen from the data, in table 1, the Elmendorf tear (MD) (g/mil) for the 70/30 blends of Component B/Component A, is nearly 10% greater than an arithmetic average of the individual components, such average being that value which would be predicted by those of skill in the art. The haze of the same blend is also 10% below (better) than that expected while the haze of a 50/50 blend is 42% less than expected and a 30/70 blend where the haze is 32% better (lower) than expected.

Example II

A commercial Z-N LLDPE (HS-7028 from Union Carbide Corp., Danbury, Conn.), (a nominal 1.0 MI, 0.918 g/cm$^3$ density, 26% CDBI, 4.25 ±20% MWD, 4.0 to 5.0 RSI) is blended with Component B. The films are made on a 1.5 inch Sterling extruder with a 3 inch die (7.62 cm) and 90 mil die gap. 1.0 mil nominal thickness films are produced with a blowup ratio (BUR) of 2.0 and die output rate of 3.0 lb./hr./die inch. Processing conditions and film properties are shown on Table 2. Of note is that the Elmendorf Tear (MD for both blends (30/70 and 70/30)) is substantially lower than predicted from an arithmetic average. The haze is somewhat lower than the arithmetic average.

Example III

Blends that follow are made using the following polyethylenes HS-7028 (described above), DYNH-1 available from Union Carbide Corp., (a HP-LDPE, 1.8 MI, 0.920 g/cm$^3$ density, typically higher than 75% CDBI, 27.3 RSI, and 6 ±15% MWD) Component A and Component B.

Films are made on a 1½ inch Sterling extruder with a 3 inch (7.62 cm) die and 90 mil die gap and a dual lip Addex® air ring. Nominal 1.0 mil films are made at a 2.0 blow up ratio (BUR) and an output rate of 3 lb./hr/die inch. The processability and film properties are shown in Table 3.

In Table 3, MD Elmendorf Tear for the 70/30 Component A/Component B blends was 36% higher than an arithmetic average while the haze of the 70/30 Component A/Component B was 28% better (lower) than predicted, while the haze of the 30/70 blend is 12.5% better (lower) than predicted. Note that the absolute haze values in this series of runs is much lower than expected and was not predicted.

In Table 4, where blends of HS-7028 (Z-N LLDPE) and Component B are made, the haze of the 70/30 HS-7028/Component B blend is 21% less than predicted and the 30/70 blend of the same constituents is 11% better (less) than the predicted amounts. However, the dart impact of the blend is poorer than an arithmetic average.

In Table 5, a HP-LDPE (DYNH-1) is extruded with Component B. The haze values are slightly improved over the average expected, but dart impact and MD Elmendorf tear both suffer. Note, the data in tables 4 and 5 is generated on the same extruder with the same conditions as Example III.

While the present invention has been described and illustrated by reference to particular embodiments thereof, it will be appreciated by those of ordinary skill in the art that the invention lends itself to variations not necessarily illustrated herein. For example, it is not beyond the scope of this invention to include additives with the claimed films or to blend resins to form the claimed films with other polymers. In addition, in another embodiment, the blends of the present invention may be irradiated. The polymer blends of the invention may also be utilized in any variety of end uses in addition to film, as is known in the art, including in molded articles and pipe. For this reason, then, reference should be made solely to the appended claims for purposes of determining the true scope of the present invention.

TABLE 1

Processing conditions and film properties for Component B/Component A blends

|  | 1 | 2 | 3 | 4 | 5 |
|---|---|---|---|---|---|
| Blend # | Component B 100% | Component B/ Component A 70/30 | Component B/ Component A 50/50 | Component B/ Component A 30/70 | Component A 100% |
| MI (I$_2$) g/10 min | 1.03 | 1.02 | 1.01 | 1.02 | 1.06 |
| MFR (I$_2$/I$_2$) | 39.2 | 28.3 | 23.7 | 19.5 | 16.8 |
| Density g/cc | 0.9188 | 0.9194 | 0.9191 | 0.9188 | 0.9183 |

TABLE 1-continued

Processing conditions and film properties for Component B/Component A blends

| | 1 | 2 | 3 | 4 | 5 |
|---|---|---|---|---|---|
| Film Extrusion | | | | | |
| Melt Temperature, °F. (°C.) | 402 (206) | 404 (207) | 408 (209) | 411 (211) | 416 (213) |
| Melt Pressure, psi (kPa) | 2700 (18616) | 3130 (21581) | 3390 (23373) | 3530 (24338) | 3810 (26269) |
| Screw Speed, RPM | 26 | 25 | 25 | 25 | 25 |
| Drive Amps | 110 | 125 | 135 | 143 | 150 |
| Output Rate, lb/hr (Kg/hr) | 154.2 (69.9) | 150.6 (68.3) | 151.8 (68.9) | 150.6 (68.3) | 151.8 (68.9) |
| Die Output Rates, lb/hr/in die | 8.2 | 8.0 | 8.1 | 8.0 | 6.1 |
| Blow-Up Ratio | 3.0 | 3.0 | 3.0 | 3.0 | 3.0 |
| FLH[1], in (cm) | 21 (53) | 23 (58) | 22 (56) | 22 (56) | 23 (58) |
| Gauge, mil | 1.0 | 1.0 | 1.0 | 1.0 | 1.0 |
| NRSI | 11.5 | 6.8 | 5.0 | 3.8 | 2.2 |
| Film Properties | | | | | |
| Tensile Strength, psi (kPa) MD | 5500 (37921) | 5900 (40679) | 6000 (41369) | 6200 (42747) | 7200 (49642) |
| Tensile Strength, psi (kPa) TD | 5600 (38610) | 5800 (39990) | 6800 (46884) | 6600 (45505) | 7000 (48263) |
| Elongation at Break, % MD | 500 | 540 | 570 | 530 | 620 |
| Elongation at Break, % TD | 680 | 660 | 680 | 700 | 660 |
| Tensile at Yield, psi (kPa) MD | — | — | — | — | — |
| Tensile at Yield, psi (kPa) TD | 1500 (10342) | 1600 (11032) | 1700 (11721) | 1600 (11032) | 1700 (11721) |
| Elongation at Yield, % MD | — | — | — | — | — |
| Elongation at Yield, % TD | 26 | 30 | 53 | 43 | 70 |
| Secant Modulus, psi (kPa) MD | 32400 (223390) | 32000 (220632) | 31000 (213737) | 30400 (209601) | 28000 (193053) |
| Secant Modulus, psi (kPa) TD | 36700 (253038) | 33200 (228906) | 32400 (223390) | 32500 (224080) | 27800 (191674) |
| Elmendorf Tear, g/mil MD | 185 | 240 | 220 | 230 | 300 |
| Elmendorf Tear, g/mil TD | 600 | 620 | 550 | 520 | 380 |
| Tensile Impact, ft-lb/in$^3$, MD | 1450 | 1600 | 1700 | 1800 | 1700 |
| Tensile Impact, ft-lb/in$^3$, TD | 1850 | 1700 | 2000 | 2200 | 2000 |
| Dart Impact, g | 360 | 400 | 480 | 560 | 590 |
| Puncture Resistance, in-lb/mil | 26 | 25 | 24 | 23 | 22 |
| Haze, % | 9.7 | 8.3 | 5.1 | 5.8 | 8.2 |
| Gloss (45 degree) | 53 | 64 | 70 | 72 | 61 |

3.5 inch (8.9 cm) Gloucester Blown Film, 6 in. (15.2 cm) die, 90 mil die gap
[1]Frost Line Height

TABLE 2

Processing conditions and film properties for Component B/Z-N LLDPE (HS-7028) blends

| | 1 | 2 | 3 | 4 |
|---|---|---|---|---|
| Blend Composition | Z-N 100% | Z-N/ Component B 70/30 | Z-N/ Component B 30/70 | Component B 100% |
| MI (I$_2$) g/10 min | 0.98 | 1.00 | 1.04 | 1.14 |
| MFR (I$_{21}$/I$_2$) | 27.1 | 29.6 | 34.4 | 37.5 |
| Density g/cc | 0.9171 | 0.9170 | 0.9210 | 0.9214 |
| Film Extrusion | | | | |
| Melt Temperature, °F. (°C.) | 400 (204) | 395 (202) | 395 (202) | 395 (202) |
| Melt Pressure, psi (kPa) | 2000 (13790) | 1950 (13445) | 1500 (10342) | 1300 (8963) |
| Screw Speed, RPM | 62 | 62 | 63 | 63 |
| Drive Amps | 11.3 | 10.8 | 10 | 9.5 |
| Die Output Rates, lb/hr/in die | 3.0 | 3.0 | 3.0 | 3.0 |
| Blow-Up Ratio | 2.0 | 2.0 | 2.0 | 2.0 |
| FLH, in | 4.5 | 4.5 | 4.5 | 4.5 |
| Gauge, mil | 1.0 | 1.0 | 1.0 | 1.0 |
| NRSI | | | | |

TABLE 2-continued

Processing conditions and film properties for Component B/Z-N LLDPE (HS-7028) blends

| | 1 | 2 | 3 | 4 |
|---|---|---|---|---|
| Film Properties | | | | |
| Tensile Strength, psi (kPa) MD | 6820 (47022) | 6980 (48125) | 6333 (43664) | 6900 (47574) |
| Tensile Strength, psi (kPa) TD | 4970 (34267) | 5260 (36266) | 5400 (37232) | 5362 (36970) |
| Elongation at Break, % MD | 450 | 405 | 380 | 380 |
| Elongation at Break, % TD | 770 | 680 | 750 | 730 |
| Tensile at Yield, psi MD | — | — | — | — |
| Tensile at Yield, psi (kPa) TD | 1438 (9915) | 1510 (10411) | 1510 (10411) | 1520 (10480) |
| Elongation at Yield, % MD | — | — | — | — |
| Elongation at Yield, % TD | 12 | 11 | 11 | 11 |
| Secant Modulus, psi (kPa) MD | 30800 (212359) | 35500 (244764) | 32400 (223390) | 33700 (232353) |
| Secant Modulus, psi (kPa) TD | 38300 (264069) | 39200 (270274) | 39400 (271653) | 40200 (277169) |
| Elmendorf Tear, g/mil MD | 582 | 318 | 138 | 61 |
| Elmendorf Tear, g/mil TD | 841 | 1148 | 1047 | 852 |
| Dart Impact, g | 78 | 93 | 127 | 142 |
| Haze, % | 8.7 | 8.3 | 9.1 | 12.0 |
| Gloss (45 degree) | 60.1 | 61.7 | 53.6 | 47.7 |

1.5 inch (3.8 cm) Old Sterling Line, 3 inch (7.62 cm) die, 90 mil die gap

TABLE 3

Processability and film properties for blends

| Component A | Component A | Component A | Component A | | Component B | |
|---|---|---|---|---|---|---|
| Component B | | Component B | Component B | Component A | | HP-LDPE |
| Blend Composition A:B | 100/0 | 70/30 | 30/70 | 0/100 | 100/0 | 0/100 |
| Film Extrusion | | | | | | |
| Melt Temp. °F. (°C.) | 406 (208) | 405 (207) | 403 (206) | 402 (206) | 406 (208) | 383 (195) |
| Head Pressure, psi | 2270 | 2050 | 1600 | 1380 | 2270 | 800 |
| Motor Load, amp | 13 | 11.9 | 10.2 | 9.2 | 13 | 6.4 |
| Film Properties | | | | | | |
| MD Elmendorf Tear (g/mil) | 198 | 238 | 145 | 118 | 198 | 386 |
| Dart Impact (g) | 443 | 383 | 257 | 209 | 443 | 50 |
| Haze (%) | 4.3 | 4.5 | 6.8 | 9.1 | 4.3 | 12.8 |

TABLE 4

Processability and film properties for HS-7028 blends

| Component A | HS-7028 | HS-7028 | HS-7028 | | HS-7028 | |
|---|---|---|---|---|---|---|
| Component B | | Component B | Component B | Component B | | HP-LDPE |
| Blend Composition A:B | 100/0 | 70/30 | 30/70 | 0/100 | 100/0 | 0/100 |
| Film Extrusion | | | | | | |
| Melt Temp. °F. (°C.) | 407 (208) | 407 (208) | 406 (208) | 402 (206) | 407 (208) | 383 (195) |
| Head Press. psi (kPa) | 2050 (14134) | 1900 (13100) | 1550 (10687) | 1380 (9515) | 2050 (14134) | 800 (5516) |
| Motor Load, amp | 11.2 | 10.6 | 10.1 | 9.2 | 11.2 | 6.4 |
| Film Properties | | | | | | |
| MD Elmendorf Tear (g/mil) | 530 | 406 | 270 | 118 | 530 | 386 |
| Dart Impact (g) | 139 | 157 | 145 | 209 | 139 | 50 |
| Haze (%) | 11.0 | 8.3 | 7.8 | 9.1 | 11.0 | 12.9 |

TABLE 5

Processability and film properties for HP-LDPE/Component B blends

| Component A | HP-LDPE | HP-LDPE | HP-LDPE | | HP-LDPE |
|---|---|---|---|---|---|
| Component B | | Component B | Component B | Component B | |
| Blend Composition A:B | 0/100 | 70/30 | 30/70 | 0/100 | 100/0 |
| Film Extrusion | | | | | |
| Melt Temperature ° F. (° C.) | 383 | 387 | 389 | 402 | 383 |
| | (195) | (197) | (198) | (206) | (195) |
| Head Pressure, psi (kPa) | 800 | 1220 | 1550 | 1380 | 800 |
| | (5516) | (8411) | (10687) | (9515) | (5516) |
| Motor Load, amp | 6.4 | 6.9 | 8.3 | 9.2 | 6.4 |
| Film Properties | | | | | |
| MD Elmendorf Tear (g/mil) | 386 | 158 | 57 | 118 | 386 |
| Dart Impact (g) | 50 | 50 | 91 | 209 | 50 |
| Haze (%) | 12.9 | 10.2 | 9.8 | 9.1 | 12.9 |

I claim:

1. A polymer blend comprising:
   a) from 10 to 90 weight percent of a first component comprising at least one first polyethylene having a molecular weight distribution in the range of from 1.5 to 3, an RSI in the range of from 1.0 to 4.0, a branching factor in the range of from 0.95 to 1, and a composition distribution breadth index in the range of from 50 to 80 percent; and
   b) from 90 to 10 weight percent of a second component comprising at least one second polyethylene having a molecular weight distribution in the range of from 3.5 to 15, an RSI in the range of from 6 to 14, a branching factor in the range of from 0.7 to 0.8, and a composition distribution breadth index in the range of from 75 to 95 percent.

2. The polymer blend of claim 1 wherein said first polyethylene is present in said blend in the range of from 40 to 85 weight percent, and said second polyethylene is present in said blend in the range of from 15 to 60 weight percent based on the total weight of said blend, said first polyethylene has a Mw/Mn in the range of from 2.5 to 3.0, RSI in the range of from 1.5 to 3.0 and a CDBI in the range of from 55 to 75%; and wherein said second polyethylene has a Mw/Mn in the range of from 3.5 to 10, RSI in the range of from 7 to 12, and branching factor in the range of from 0.72 to 0.78, and a CDBI in the range of from 80 to 90%.

3. The polymer blend of claim 1 wherein said first polyethylene is present in said blend in the range of from 50 to 80 weight percent, and said second polyethylene is present in said blend in the range of from 20 to 50 weight percent based on the total weight of said blend, wherein said first polyethylene has a Mw/Mn in the range of from 2.5 to 3.0, RSI in the range of from 2.0 to 3 and a CDBI in the range of from 50 to 70%; and wherein said second polyethylene has a Mw/Mn in the range of from 3.5 to 7.5, RSI in the range of from 8 to 11, branching factor in the range of from 0.73 to 0.78 and a CDBI in the range of from 80 to 90%.

4. A blown film comprising the polymer blend of claim 1 wherein the film has a haze in the range of from 3 to 10% and a gloss in the range of from 50 to 80.

5. The blown film of claim 4 wherein the film has a haze in the range of from 4 to 9% and a gloss in the range of from 55 to 75.

6. The blown film of claim 4 wherein the film has a haze in the range of from 5 to 9% and a gloss in the range of from 60 to 75.

7. The polymer blend of claim 1 wherein the first polyethylene and the second polyethylene are both metallocene polyethylenes produced in a gas phase polymerization process.

8. A blown film comprising the polymer blend of claim 2 wherein the film has a haze in the range of from 3 to 10% and a gloss in the range of from 50 to 80.

9. The blown film of claim 8 wherein the film has a haze in the range of from 4 to 9% and a gloss in the range of from 55 to 75.

10. The blown film of claim 8 wherein the film has a haze in the range of from 5 to 9% and a gloss in the range of from 60 to 75.

11. The polymer blend of claim 2 wherein the first polyethylene and the second polyethylene are both metallocene polyethylenes produced in a gas phase polymerization process.

12. A blown film comprising the polymer blend of claim 3 wherein the film has a haze in the range of from 3 to 10% and a gloss in the range of from 50 to 80.

13. The blown film of claim 12 wherein the film has a haze in the range of from 4 to 9% and a gloss in the range of from 55 to 75.

14. The blown film of claim 12 wherein the film has a haze in the range of from 5 to 9% and a gloss in the range of from 60 to 75.

15. The polymer blend of claim 3 wherein the first polyethylene and the second polyethylene are both metallocene polyethylenes produced in a gas phase polymerization process.

16. A blown polyethylene film polymer blend comprising:
   a) in the range of from 50 to 75 weight percent of a first polyethylene having a Mw/Mn in the range of from 1.5 to 3.0, an RSI in the range of from 2.5 to 3.0, a branching factor in the range of from 0.95 to 1, and a CDBI in the range of from 50 to 70%; and
   b) in the range of from 25 to 50 weight percent of a second polyethylene having a Mw/Mn in the range of from 3.5 to 7.5, an RSI in the range of from 8 to 11, a branching factor in the range of from 0.73 to 0.78, and a CDBI in the range of from 80 to 90%;

wherein said film has a haze in the range of from 5 to 8%; and wherein said film has a gloss (45°) in the range of from 60 to 75.

* * * * *